(12) United States Patent
Kato

(10) Patent No.: US 7,811,481 B2
(45) Date of Patent: Oct. 12, 2010

(54) POLARIZING PLASTIC OPTICAL DEVICE AND PROCESS FOR PRODUCING THE SAME

(75) Inventor: Sumio Kato, Sabae (JP)

(73) Assignee: Sunlux Co., Ltd., Fukui-Ken (JP)

( * ) Notice: Subject to any disclaimer, the term of this patent is extended or adjusted under 35 U.S.C. 154(b) by 590 days.

(21) Appl. No.: 11/578,749

(22) PCT Filed: Feb. 18, 2005

(86) PCT No.: PCT/JP2005/002580

§ 371 (c)(1), (2), (4) Date: Oct. 18, 2006

(87) PCT Pub. No.: WO2005/103772

PCT Pub. Date: Nov. 3, 2005

(65) Prior Publication Data

US 2007/0241313 A1    Oct. 18, 2007

(30) Foreign Application Priority Data

Apr. 19, 2004    (JP)    ............... 2004-123358

(51) Int. Cl.
*B29D 11/00*    (2006.01)

(52) U.S. Cl. ............... 264/1.32; 264/2.2; 264/2.5; 264/328.7; 264/328.8; 425/808

(58) Field of Classification Search ............... 264/1.1, 264/1.31, 1.32, 2.5, 2.2, 328.7, 328.8, 255; 252/585; 425/808

See application file for complete search history.

(56) References Cited

U.S. PATENT DOCUMENTS

| | | | | |
|---|---|---|---|---|
| 3,711,417 | A * | 1/1973 | Schuler | ............... 252/585 |
| 3,846,013 | A | 11/1974 | Cohen | |
| 6,734,272 | B2 | 5/2004 | Tamura et al. | |
| 2004/0188873 | A1 | 9/2004 | Ono et al. | |
| 2007/0024973 | A1 * | 2/2007 | Baiocchi et al. | ............... 359/487 |

FOREIGN PATENT DOCUMENTS

| | | |
|---|---|---|
| JP | 49-049646 | 5/1974 |
| JP | 10-081726 | 3/1998 |
| JP | 2000-258734 | 9/2000 |
| JP | 2001-311804 | 11/2001 |
| JP | 2002 187931 | 7/2002 |
| WO | 03/008171 | 1/2003 |

* cited by examiner

*Primary Examiner*—Mathieu D. Vargot
(74) *Attorney, Agent, or Firm*—Fay Kaplun & Marcin, LLP

(57) ABSTRACT

A polarizing plastic lens comprising a polarizing film with low tendency to detachment from an optical resin layer. There is provided polarizing plastic lens comprising polarizing film constituted of a polyvinyl alcohol resin. Two optical resin layers of different thicknesses may be disposed on both surfaces of the polarizing film. The optical resin layers are formed by polymerizing a polymerization raw material composition in contact with the polarizing film. The polymerization raw material composition contains as one main component an isocyanated or isothiocyanated compound. The iscocyanate or isothiocyanate functional group reacts with the hydroxyl of polyvinyl alcohol resin of polarizing film to thereby form an urethane bond or thiourethane bond, so that the optical resin layers are strongly unified with the polarizing film.

5 Claims, 3 Drawing Sheets

POLARIZING PLASTIC OPTICAL DEVICE AND PROCESS FOR PRODUCING THE SAME

FIELD OF THE INVENTION

The present invention relates to a polarizing plastic optical element and a method for manufacturing the same, more specifically, to an optical lens, such as an eyeglasses lens, a polarizing plastic lens for a display device, such as liquid crystal display device, and a polarizing plastic film.

BACKGROUND OF THE INVENTION

A conventional polarizing plastic lens is illustrated in FIGS. 2 and 3 of Japanese Laid-Open Patent Publication No. 2001-311804. Such polarizing plastic lens includes a polarizing film made of polyvinyl alcohol resin held within a lens made of diethylene glycol bis(allyl carbonate) resin.

The polarizing plastic lens is manufactured using an annular gasket and a pair of mold members. The gasket has an inner surface formed with a supporting protrusion and an outer surface including two resin injection pipes. The two mold members are fitted to the inner surface of the gasket.

When manufacturing the polarizing plastic lens, the peripheral edge of the polarizing film is first placed on the supporting protrusion of the gasket, and then the two mold members are fitted to the inner surface of the gasket. A cavity is thus defined between the two mold members, and the polarizing film is arranged in the cavity. Diethylene glycol bis(allyl carbonate) resin is injected into the cavity through the resin injection pipes. The resin is polymerized and cured. The molded polarizing plastic lens is obtained by removing the mold members from the gasket.

Patent Publication 1: Japanese Laid-Open Patent Publication No. 2001-311804

However, in the conventional polarizing plastic lens, the lens and the polarizing film each have a different coefficient of thermal expansion. Thus, the polarizing film tends to separate from the lens when an environmental change such as temperature change occurs.

SUMMARY OF THE INVENTION

It is an object of the present invention to provide a polarizing plastic optical element in which the polarizing film is less likely to be separated from the optical resin layer, and a method for manufacturing the same.

To achieve the above object, one aspect of the present invention is a polarizing plastic optical element including a polarizing film having first and second surfaces and optical resin layers arranged on the first and second surfaces of the polarizing film. The polarizing film contains a hydroxyl group-containing resin, raw material for the optical resin layer is made of resin obtained by polymerizing a polymerization raw material composition containing a first compound containing a first functional group, a second compound containing a second functional group, and a polymerization catalyst. The first and second compounds are main components of the polymerization raw material composition. The first functional group is at least one selected from isocyanate functional group and isothiocyanate functional group. The second functional group is at least one selected from hydroxyl group and mercapto group. The first functional group forms an urethane bond or a thiourethane bond with hydroxyl group of the polarizing film.

Another aspect of the present invention provides a method for manufacturing a polarizing plastic optical element including a polarizing film and optical resin layers. The method includes preparing a polymerization raw material composition containing a first compound containing a first functional group, a second compound containing a second functional group, and a polymerization catalyst. The first and second compounds are main components of the polymerization raw material composition. The first functional group is at least one selected from isocyanate functional group and isothiocyanate functional group. The second functional group is at least one selected from hydroxyl group and mercapto group. The method further includes the steps of preparing a mold assembly including a first mold component having an opening and including an inner bottom surface and a side surface defining a first cavity, a fastening member attached to the first mold component, and a second mold component for closing the opening of the first mold component, injecting the polymerization raw material composition into the first cavity, arranging the polarizing film on the polymerization raw material composition, attaching the fastening member to the first mold component and holding a peripheral portion of the polarizing film between the fastening member and the first mold component, attaching the second mold component to the fastening member and defining a second cavity between the polarizing film and the second mold component, injecting the polymerization raw material composition into the second cavity, and polymerizing and curing the polymerization raw material composition in the first and second cavities.

A further aspect of the present invention provides a method for manufacturing a polarizing plastic optical element including a polarizing film and optical resin layers, the method includes preparing a polymerization raw material composition containing a first compound containing a first functional group, a second compound containing a second functional group, and a polymerization catalyst, the first and second compounds being main components of the polymerization raw material composition, the first functional group being at least one selected from isocyanate functional group and isothiocyanate functional group, the second functional group being at least one selected from hydroxyl group and mercapto group. The method further includes the steps of preparing a mold assembly including a first mold component having an opening, a fastening member attached to the first mold component, and a second mold component for closing the opening of the first mold component, attaching the fastening member to the first mold component and holding a peripheral portion of the polarizing film between the fastening member and the first mold component, attaching the second mold component to the fastening member and defining a first cavity and a second cavity between the first mold component and the polarizing film and between the second mold component and the polarizing film, respectively, injecting the polymerization raw material composition into the first and second cavities, and polymerizing and curing the polymerization raw material composition in the first and second cavities.

A further aspect of the present invention is a method for manufacturing a polarizing plastic optical element including a polarizing film and optical resin layers. The method includes preparing a polymerization raw material composition containing a first compound containing a first functional group, a second compound containing a second functional group, and a polymerization catalyst, the first and second compounds being main components of the polymerization raw material composition, the first functional group being at least one selected from isocyanate functional group and isothiocyanate functional group, the second functional group being at least one selected from hydroxyl group and mercapto group. The method further includes preparing a mold assembly including a first mold component having an inner bottom surface, a fastening member attached to the first mold component, and a second mold component attached to the first mold component, arranging the polarizing film on the inner bottom surface of the first mold component, attaching the fastening member to the first mold component and holding a peripheral portion of the polarizing film between the fastening member and the first mold component, attaching the second mold component to the first mold component and defining a first cavity between the second mold component and a first main surface of the polarizing film, injecting the polymerization raw material composition into the first cavity, polymerizing and curing the polymerization raw material composition to mold an intermediate molded product including an optical resin layer integrated with the first main surface of the polarizing film, removing the intermediate molded product from the first mold component, attaching the intermediate molded product to a third mold component and defining a second cavity between a second main surface of the polarizing film and an inner surface of the third mold component, injecting the polymerization raw material composition into the second cavity, and polymerizing and curing the polymerization raw material composition in the second cavity.

DETAILED DESCRIPTION OF THE PREFERRED EMBODIMENTS

A polarizing plastic lens according to a first embodiment of the present invention will now be described.

Figure 1:
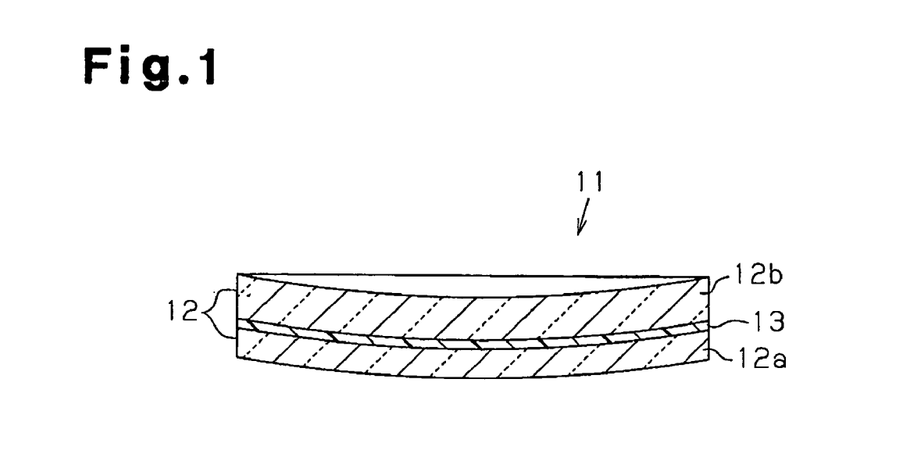
FIG. 1 is a cross-sectional view of a polarizing plastic lens according to a first embodiment of the present invention.

As shown in FIG. 1, the polarizing plastic lens 11 includes a polarizing film 13 and lens layers (optical resin layers) 12a and 12b made of synthetic resin arranged on two main surfaces of the polarizing film 13. The cross-section of the polarizing plastic lens 11 has a gradually curved surface. The upper side lens layer 12b has an upper surface with a concave shape, and the lower side lens layer 12a has a lower surface with a convex shape. The upper side lens layer 12a and the lower side lens layer 12a have different thicknesses. The polarizing film 13 is formed from a hydroxyl group-containing resin, such as polyvinyl alcohol resin. The polarizing plastic lens 11 is used as a lens for sunglasses or the like.

The polarizing film 13 is formed by uniaxially stretching the polyvinyl alcohol resin and immersing a polarizer such as iodine compound. The thickness of the polarizing film 13 is adjusted to about 20 μm. The polarizing film 13 may contain polyester polyol resin as the main component.

The lens layers 12a and 12b are formed from resin obtained by polymerizing polymerization raw material composition containing a first compound containing a first functional group (isocyanate functional group (—NCO) or isothiocyanate functional group (—NCS)), a second compound containing a second functional group (hydroxyl group (—OH) or mercapto group (—SH)), and a polymerization catalyst. The first and second compounds are the main components of the polymerization raw material composition. An internal mold release agent and ultraviolet absorber are preferably added to the polymerization raw material composition when molding the lens layers 12a and 12b. In this case, the formation composition of the lens layers 12a and 12b contains polymerization raw material composition, internal mold release agent, and ultraviolet absorber. In one embodiment, the first compound and the second compound are monomers.

In one embodiment, the thickness of the lens layer 12b is adjusted to about 1.5 mm, and the thickness of the lens layer 12a to about 1 mm. The refractive index of each lens layer 12a and 12b is 1.6 to 1.7, the Abbe number of each lens layer 12a and 12b is between 32 and 43, and the specific gravity of each lens layer 12a and 12b is between 1.3 and 1.37.

The first functional group contained in the polymerization raw material composition of the lens layers 12a and 12b and hydroxyl group of the polyvinyl alcohol resin constituting the polarizing film 13 are urethane bonded or thiourethane bonded. The lens layers 12a and 12b and the polarizing film 13 are thereby strongly bonded, and the polarizing film 13 is prevented from being separated from the lens layers 12a and 12b.

The first compound is a compound containing isocyanate functional group or a compound containing isothiocyanate functional group. The compound containing isocyanate functional group includes isocyanate compound and isothiocyanate compound containing isocyanate functional group. The compound containing isothiocyanate functional group includes isothiocyanate compounds.

The second compound is an active hydrogen containing compound such as a compound containing hydroxyl group and compound containing mercapto group. The compound containing hydroxyl group includes hydroxy compound and mercapto compound containing hydroxyl group. The compound containing mercapto group includes mercapto compound.

Examples of said isothiocyanate compound include: aromatic isocyanates, such as m-xylylene diisocyanate, p-xylylene diisocyanate, tetrachloro-m-xylylene diisocyanate, hydrated xylylene diisocyanate, tetramethylxylylene diisocyanate, hydrated diphenylmethane diisocyanate, phenylisocyanate, phenylenediisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, triphenylmethane triisocyanate, polymeric MDI, naphthalene triisocyanate, diphenylmethane-2,4,4'-triisocyanate, 3-methyldiphenyl-methane-4,6,4'-triisocyanate, 4-methyl-diphenylmethane-3,5,2',4',6'-pentaisocyanate, phenylisocyanatomethylisocyanate, phenylisocyanatoethylisocyanate, tetrahydronaphthylene diisocyanate, hexahydrobenzene diisocyanate, hexahydrodiphenylmethane-4,4'-diisocyanate, diphenylether diisocyanate, ethyleneglycol diphenylether diisocyanate, 1,3-propyleneglycol diphenylether diisocyanate, benzophenone diisocyanate, diethyleneglycol diphenylether diisocyanate, dibenzofuran isocyanate, carbazole diisocyanate, ethylcarbazole diisocyanate, and dichlorocarbazole diisocyanate; alicyclic isocyanates, such as 1,4-bis(isocyanatemethyl)cyclohexane, cyclohexyl isocyanate, isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2'-dimethyldicyclohexylmethane diisocyanate, bis(4-isocyanato-n-butylidene)pentaerythritol, dimer diisocyanate, 2-isocyanatomethyl-3-(3-isocyanatopropyl)-5-isocyanatomethyl -bicyclo [2,2,1]-heptane, 2-isocyanatomethyl-3-(3-isocyanatopropyl)-6-isocyanatomethyl-bicyclo [2,2,1]-heptane, 2-isocyanatomethyl-2-(3-isocyanatopropyl)-5-isocyanatomethyl-bicyclo [2,2,1]-heptane, 2-isocyanatomethyl-2-(3-isocyanatopropyl)-6-isocyanatomethyl-bicyclo[2,2,1]-heptane, 2-isocyanatomethyl-3-(3-isocyanatopropyl)-6-(2-isocyanatoethyl)-bicyclo[2,2,1]-heptane, 2-isocyanatomethyl-3-(3-isocyanatopropyl)-6-(2-isocyanatoethyl)-bicyclo[2,1,1]-heptane, 2-isocyanatomethyl-2-(3-isocyanatopropyl)-5-(2-isocyanatoethyl)-bicyclo[2,2,1]-heptane, 2-isocyanatomethyl-2-(3-isocyanatopropyl)-6-(2-isocyanatoethyl)-bicyclo[2,2,1]-heptane and, 1,3,5-tris(isocyanatemethyl)cyclohexane; aliphatic isocyanates, such as butylisocyanate, ethylene diisocyanate, trimethylene diisocyanate, tetramethylene diisocyanate, hexamethylene diisocyanate, octamethylene diisocyanate, nonamethylene diisocyanate, 2,2'-dimethyl pentane diisocyanate, 2,2,4-trimethyl hexamethylene diisocyanate, decamethylene diisocyanate, butene diisocyanate, 1,3-butadiene-1,4-diisocyanate, 2,4,4-trimethyl hexamethylene diisocyanate, 1,6,11-undecatriisocyanate, 1,3,6-hexamethylene triisocyanate, 1,8-diisocyanato-4-isocyanatomethyloctane, 2,5,7-trimethyl-1,8-diisocyanato-5-isocyanatomethyloctane, bis(isocyanatoethyl) carbonate, bis(isocyanatoethyl)ether, 1,4-butyleneglycol dipropyl ether-ω,ω'-diisocyanate, lysinediisocyanatomethyl ester, lysine triisocyanate, 2-isocyanatoethyl-2,6-diisocyanatohexanoate, 2-isocyanatopropyl-2,6-diisocyanatohexanoate, bis(isocyanatoethyl)benzene, bis(isocyanatopropyl)benzene, α,α,α',α'-tetramethyl xylylene diisocyanate, bis(isocyanatobutyl)benzene, bis(isocyanatomethyl)naphthalene, bis(isocyanatomethyl)diphenyl ether, bis(isocyanatoethyl) phthalate, mesitylylenetriisocyanate, 2,6-di(isocyanatomethyl)furan; sulfur-containing aliphatic isocyanates; aromatic sulfide isocyanates; aromatic disulfide isocyanates; aromatic sulfonic isocyanates; aromatic sulfonic amides; sulfur-containing heterocyclic compounds, and the like.

Examples of said isothiocyanate compounds includes aromatic isothiocyanates, such as phenylisothiocyanate, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanato-1,1'-biphenyl, 1,1'-methylene bis(4-isothiocyanatobenzene), 1,1'-methylene bis(4-isothiocyanato-2-methyl benzene), 1,1'-methylene bis(4-isothiocyanato-3-methyl benzene), 1,1'-(1,2-ethanediyl) bis(4-isothiocyanatobenzene), 4,4'-diisothiocyanatobenzophenone, 4,4'-diisothiocyanato-3,3'-dimethyl benzophenone, benzanilide-3,4'-diisothiocyanate, diphenyl ether-4,4'-diisothiocyanate, and diphenylamine-4,4'-diisothiocyanate; aliphatic isothicyanates, such as butyl isothiocyanate, 1,2-diisothiocyanatoethane, 1,3-isothicyanatopropane, 1,4-diisothiocyanatobutane, 1,6-diisothicyanatohexane, and p-phenylene diisopropylidene diisothiocyanate; alicyclic isothiocyanates, such as cyclohexyl isothiocyanate and cyclohexane diisothiocyanate; heterocyclic isothiocyanates, such as 2,4,6-triisothiocyanato-1,3,5-triazine; and carbonyl isothiocyanates, such as hexanedioyl diisothiocyanate, nonanedioyl diisothiocyanate, carbonic diisothiocyanate, 1,3-benzenedicarbonyl diisothiocyanate, 1,4-benzenedicarbonyl diisothiocyanate, (2,2'-bipyridine)-4,4'-dicarbonyl diisothiocyanate.

Said isothiocyanate compounds include compounds containing sulfur atom in addition to isothiocyanate group. Examples of said polyfunctional isothiocyanate containing one or more sulfur atoms in addition to isothiocyanate group include, sulfur-containing aliphatic isothiocyanates, such as thiobis(3-isothiocyanatopropane), thiobis(2-isothiocyanatoethane), and dithiobis(2-isothiocyanatoethane); sulfur-containing aromatic isothiocyanates, such as 1-isothiocyanato-4-{(2-isothiocyanato)sulfonyl}benzene, thio bis(4-isothiocyanatobenzene), sulfonylbis(4-isothiocyanatobenzene), sulfinylbis(4-isothiocyanatobenzene), dithiobis(4-isothiocyanatobenzene), 4-isothiocyanato-1-{(4-isothiocyanatophenyl)sulfonyl}-2-methoxy-benzene, 4-methyl-3-isothiocyanatobenzenesulfonyl-4'-isothiocyanatophenyl ester, and 4-methyl-3-isothiocyanatobenzenesulfonyl anilide-3'-methyl-4'-isothiocyanate; and sulfur-containing heterocyclic compounds, such as thiophene-2,5-diisothiocyanate, 1,4-dithiane-2,5-diisothiocyanate.

Examples of said isocyanate group-containing isothiocyanate compounds include aromatic compounds, such as 1-isocyanato-4-isothiocyanatobenzene and 4-methyl-3-isocyanato-1-isothiocyanatobenzene; aliphatic or alicyclic compounds, such as 1-isocyanato-3-isothiocyanatopropane, 1-isocyanato-5-isothiocyanatopentane, 1-isocyanato-6-isothiocyanatohexane, isocyanatocarbonyl isothiocyanate, and 1-isocyanato-4-isothiocyanatocyclohexane; heterocyclic compounds, such as 2-isocyanato-4,5-diisothiocyanato-1,3,5-triazine; and compounds containing isothiocyanate group and sulfur atom, such as 4-isocyanato-4'-isothiocyanatodiphenyl sulfide and 2-isocyanato-2'-isothiocyanatodiethyl disulfide.

The first compound may be one type or a mixture of two or more types. The preferable first compound is an aromatic isocyanate compound that is superior in reactivity with hydroxyl group derived from polyvinyl alcohol resin of the polarizing film 13, and the especially preferable first compound is m-xylylendiisocyanate.

Examples of said hydroxy compounds include, aliphatic alcohols, such as methanol, benzylalcohol, phenol, ethoxyethanol, ethyleneglycol, diethyleneglycol, propyleneglycol, dipropyleneglycol, butyleneglycol, neopentylglycol, glycerol, trimethylol ethane, trimethylolpropane, butanetriol, 1,2-methyl glucoside, pentaerythritol, dipentaerythritol, tripentaerythritol, sorbitol, erythritol, threitol, ribitol, arabinitol, xylitol, allitol, mannitol, dolcitol, iditol, glycol, inositol, hexanetriol, triglycerose, diglyperol, triethyleneglycol, polyethyleneglycol, tris(2-hydroxyethyl)isocyanulate, cyclobutanediol, cyclopentanediol, cyclohexanediol, cycloheptanediol, cyclooctanediol, cyclohexane dimethanol, hydroxypropyl cyclohexanol, trichloro[5,2,1,0,2,6]decane-dimethanol, bicyclo[4,3,0]-nonanediol, dicyclohexanediol, trycyclo[5,3,1,1]dodecanediol, bicyclo[4,3,0]nonane dimethanol, tricyclo [5,3,1,1]dodecane-diethanol, hydroxy propyl tricyclo[5,3,1,1]dodecanol, spiro[3,4]octanediol, butyl cyclohexanediol, 1,1'-bicyclohexylidenediol, cyclohexane triol, maltitol, lacitiol; aromatic alcohols, such as polyol, dihydroxy naphthalene, trihydroxy naphthalene, tetrahydroxy naphthalene, dihydroxy benzene, benzene triol, biphenyl tetraol, pyrogallol, (hydroxy naphthyl)pyrogallol, trihydroxy phenanthrene, bisphenol A, bisphenol F, xylyleneglycol, and tetrabrombisphenol A; polyols; addition reaction products of polyols and alkylene oxides, such as ethyleneoxide and propyleneoxide; condensation reaction products of said polyols and polymeric polyols, such as epoxy resins, or halogenated alcohols, such as dibromo neopentylglycol, condensation reaction products of said polyols and organic acids, such as oxalic acid, glutamic acid, adipic acid, acetic acid, propionic acid, cyclohexane carboxylic acid, β-oxocyclohexane propionic acid, dimer acid, phthalic acid, isophthalic acid, salicylic acid, 3-bromopropionic acid, 2-bromoglycol, dicarboxy cyclohexane, pyromellitic acid, butane tetracarboxylic acid, and bromo phthal acid; addition reaction products of said polyols and alkylene oxides, such as ethyleneoxide and propyleneoxide; addition reaction products of alkylene polyamines and alkylene oxides, such as ethyleneoxide and propyleneoxide; bis-[4-(hydroxy ethoxy)phenyl]sulfide, bis-[4-(2-hydroxy propoxy)phenyl]sulfide, bis-[4-2,3-dihydroxy propoxy)phenyl]sulfide, bis-[4-(4-hydroxy cyclohexyloxy) phenyl]sulfide, bis-[2-methyl-4-(hydroxy ethoxy)-6-butylphenyl]sulfide and these compounds incorporating 3 or less average molecules of ethylene oxide and/or propylene oxide per one hydroxyl group; and polyols containing sulfur atom, such as di-(2-hydroxyethyl)sulfide, 1,2-bis-(2-hydroxyethylmercapto)ethane, bis(2-hydroxyethyl)disulfide, 1,4-dithiane-2,5-diol, bis(2,3-dihydroxy propyl)sulfide, tetrakis(4-hydroxy-2-thiabutyl)methane, bis(4-hydroxy phenyl)sulfon (product name: bisphenol S), tetrabromobisphenol S, tetramethyl bisphenol S, 4,4'-thio bis(6-tert-butyl-3-methyl phenol), and 1,3-bis(2-hydroxyethyl thio ethyl)-cyclohexane.

Examples of said mercapto compounds include aliphatic thiols, such as pentaerythritol tetrakis(3-mercapto propionate), 1,2-bis(2-mercapto ethylthio)-3-mercapto propane, 4-mercapto methyl-3,6-dithio-1,8-octane dithiol, methyl mercaptan, benzene thiol, benzyl thiol, methane dithiol, 1,2-ethane dithiol, 1,1-propane dithiol, 1,2-propane dithiol, 1,3-propane dithiol, 2,2-propane dithiol, 1,6-hexane dithiol, 1,2,3-propane trithiol, tetrakis(mercapto methyl)methane, 1,1-cyclohexane dithiol, 1,2-cyclohexane dithiol, 2,2-dimethylpropane-1,3-dithiol, 3,4-dimethoxy butane-1,2-dithiol, 2-methyl cyclohexane-2,3-dithiol, bicyclo[2,2,1]hepta-exo-cis-2,3-dithiol, 1,1-bis(mercapto methyl)cyclohexane, thio maleate bis(2-mercaptoethyl ester), 2,3-dimercapto succinate(2-mercapto ethyl ester), 2,3-dimercapto-1-propanol(2-mercaptoacetate), 2,3-dimercapto-1-propanol(3-mercaptoacetate), diethyleneglycol bis(2-mercaptoacetate), diethyleneglycol bis(3-mercapto propionate), 1,2-dimercapto propyl methyl ether, 2,3-dimercapto-propyl methyl ether, 2,2-bis(mercapto methyl)-1,3-propane dithiol, bis(2-mercapto ethyl)ether, ethyleneglycol bis(2-mercaptoacetate), ethyleneglycol bis(3-mercapto propionate), trimethylol propane tris(2-mercaptoacetate), trimethylol propane tris(3-mercapto propionate), pentaerythritol tetrakis(2-mercaptoacetate), pentaerythritol tetrakis(3-mercapto propionate); aromatic thiols, such as 1,2-dimercapto benzene, 1,3-dimercapto benzene, 1,4-dimercapto benzene, 1,2-bis(mercapto methyl)benzene, 1,3-bis(mercapto methyl)benzene, 1,4-bis(mercapto methyl)benzene, 1,2-bis(mercapto ethyl)benzene, 1,3-bis(mercapto ethyl)benzene, 1,4-bis(mercapto ethyl)benzene, 1,2-bis(mercapto methoxy)benzene, 1,3-bis(mercapto methoxy)benzene, 1,4-bis(mercapto methoxy)benzene, 1,2-bis(mercapto ethoxy)benzene, 1,3-bis(mercapto ethoxy)benzene, 1,4-bis(mercapto ethoxy)benzene, 1,2,3-trimercapto benzene, 1,2,4-trimercapto benzene, 1,3,5-trimercapto benzene, 1,2,3-tris(mercapto methyl)benzene, 1,2,4-tris(mercapto methyl)benzene, 1,3,5-tris(mercapto methyl)benzene, 1,2,3-tris(mercapto ethyl)benzene, 1,2,4-tris(mercapto ethyl)benzene, 1,3,5-tris(mercapto ethyl)benzene, 1,2,3-tris(mercapto methoxy)benzene, 1,2,4-tris(mercapto methoxy)benzene, 1,3,5-tris(mercapto methoxy)benzene, 1,2,3-tris(mercapto ethoxy)benzene, 1,2,4-tris(mercapto ethoxy)benzene, 1,3,5-tris(mercapto ethoxy)benzene, 1,2,3,4-tetramercapto benzene, 1,2,3,5-tetramercapto benzene, 1,2,4,5-tetramercapto benzene, 1,2,3,4-tetrakis(mercapto methyl)benzene, 1,2,3,5-tetrakis(mercapto methyl)benzene, 1,2,4,5-tetrakis(mercapto methyl)benzene, 1,2,3,4-tetrakis(mercapto ethyl)benzene, 1,2,3,5-tetrakis(mercapto ethyl)benzene, 1,2,4,5-tetrakis(mercapto ethyl)benzene, 1,2,3,4-tetrakis(mercapto ethyl)benzene, 1,2,3,5-tetrakis(mercapto methoxy)benzene, 1,2,4,5-tetrakis(mercapto methoxy)benzene, 1,2,3,4-tetrakis(mercapto ethoxy)benzene, 1,2,3,5-tetrakis(mercapto ethoxy)benzene, 1,2,4,5-tetrakis(mercapto ethoxy)benzene, 2,2'-dimercapto biphenyl, 4,4'-dimercapto biphenyl, 4,4'-dimercapto bibenzyl, 2,5-toluene dithiol, 3,4-toluene dithiol, 1,4-naphthalene dithiol, 1,5-naphthalene dithiol, 2,6-naphthalene dithiol, 2,7-naphthalene dithiol, 2,4-dimethyl benzene-1,3-dithiol, 4,5-dimethyl benzene-1,3-dithiol, 9,10-anthracene dimethane thiol, 1,3-di(p-methoxyphenyl)propane-2,2-dithiol, 1,3-diphenyl propane-2,2-dithiol, phenyl methane-1,1-dithiol, and 2,4-di(p-mercapto phenyl)pentane; halogen substituted aromatic thiols; heterocyclic thiols; aromatic thiols containing mercapto group and sulfur atom; aliphatic thiols containing mercapto group and sulfur atom; and heterocyclic compounds containing mercapto group and sulfur atom.

Examples of said hydroxyl group-containing mercapto compounds include 2-mercapto ethanol, 3-mercapto-1,2-propanediol, glycerine di(mercaptoacetate), 1-hydroxy-4-mercapto cyclohexane, 2,4-dimercapto phenol, 2-mercapto hydroquinone, 4-mercapto phenol, 1,3-dimercapto-2-propanol, 2,3-dimercapto-1-propanol, 1,2-dimercapto-1,3-butanediol, pentaerythritol tris(3-mercapto propionate), pentaerythritol mono(3-mercapto propionate), pentaerythritol bis(3-mercapto propionate), pentaerythritol tris(thioglycolate), pentaerythritol pentakis(3-mercapto propionate), hydroxymethyl-tris(mercapto ethylthio methyl)methane, 1-hydroxyethyl thio-3-mercapto ethylthio benzene, 4-hydroxy-4'-mercapto diphenyl sulfon, 2-(2-mercapto ethylthio) ethanol, dihydroxyethylsulfide mono(3-mercapto propionate), dimercaptoethane mono(salicylate), hydroxyethyl thio methyl-tris(mercapto ethylthio)methane.

The second compound may be a halogen substituted compound such as chlorine substituted compound or bromine substituted compound of the active hydrogen containing compound. The active hydrogen compound may be one type or a mixture of two or more types. The preferable second compound is the mercapto compound that enables a higher refractive index of the lens layers 12a and 12b. The more preferable second compound is a multi-functional mercapto compound that includes at least four mercapto groups in one molecule such as pentaerythritol tetrakis (3-mercaptopropionate) and 1,2-bis(2-mercaptoethylthio)-3-mercaptopropane.

The ratio of the first compound and the second compound is preferably adjusted so that the equivalence ratio of the first functional group and the second functional group expressed in the following equation is between 0.5 and 1.5. The equivalence ratio is more preferably between 0.8 and 1.2.

Equivalence ratio of functional group=[(—NCO)+(—NCS)]/[(—OH)+(—SH)]

If the equivalence ratio of the functional group is less than 0.5, the first functional group (—NCO or —NCS) that can react with hydroxyl group of the polarizing film 13 barely exists, and thus an urethane bond or thiourethane bond between the lens layers 12a and 12b and the polarizing film 13 is not formed or is insufficient. If the equivalence ratio of the functional group is greater than 1.5, the numerical average molecular mass of the resin formed from the first compound becomes high, and the viscosity of the polymerization raw material composition increases. In this case, the time required for deaeration in a step of molding the lens layers 12a and 12b becomes long and the manufacturing efficiency lowers.

The polymerization catalyst includes one of tertiary phosphine, tertiary amine, or Lewis acid. The used amount of the polymerization catalyst is preferably 0.0005 to 5% by mass, and more preferably 0.001 to 2% by mass with respect to the total amount of the first compound and the second compound (active hydrogen containing compound).

If the amount of the polymerization catalyst used is less than 0.0005% by mass, the rate at which polymerization reaction proceeds tends to lower. If the amount used is greater than 5% by mass, the reaction proceeds during the preparation of the polymerization raw material composition, and the viscosity of the polymerization raw material composition tends to increase.

Examples of said tertiary phosphines include tri(n-butyl) phosphine, triphenyl phosphine, trimethyl phosphine, triethyl phosphine, tripropyl phosphine, triisopropyl phosphine, tri(t-butyl)phosphine, tricyclohexyl phosphine, tribenzyl phosphine, diphenylmethyl phosphine, dimethyl phenyl phosphine, diethylphenyl phosphine, tri(o-tolyl)phosphine, trimesityl phosphine, 1,2-bis(dimethyl phosphino)ethane, 1,4-bis(diphenyl phosphino)butane, 2,3-bis(diphenyl phosphino)butane, 1,2-bis(diphenyl phosphino)ethane, bis(diphenyl phosphino)methane, 1,3-bis(diphenyl phosphino)propane, 1,2-bis(diphenyl phosphino) propane, 1,5-bis(diphenyl phosphino)pentane.

Examples of said tertiary amines include, N,N-dimethyl cyclohexylamine, N,N-diethyl cyclohexylamine, tributylamine, triethylamine, tripropylamine, dipropyl ethylamine, trihexylamine, dimethyl cyclohexylamine, dicyclohexylmethylamine, tricyclohexylamine, diethyl cyclohexylamine, dicyclohexylethylamine, dipropyl cyclohexylamine, dicyclohexylpropylamine, dibutyl cyclohexylamine, dicyclohexyl butylamine, N,N-dimethylbenzylamine, N,N-diethyl benzylamine, N,N-dipropyl benzylamine, N,N-dibutyl benzylamine, N-methyl dibenzylamine, 2-dimethylamino methyl phenol, 2,4,6-tris(N,N-dimethylamino methyl)phenol, and triethylene diamine.

Examples of said Lewis acids include, tin compounds, such as dibutyltin dichloride, dimethyltin dichloride, trimethyltin chloride, tributyltin chloride, triphenyltin chloride, dibutyltin sulfide, di(2-ethylhexyl)tin oxide, tin tetrafluoride, tin tetra chloride, tin tetrabromide, tin tetra iodide, methyltin trichloride, butyltin trichloride; zinc compounds, such as zinc chloride, zinc acetyl acetonate, and zinc dibutyldithio)carbamate; iron compounds, such as iron chloride and iron acetyl acetonate; aluminum compounds, such as alumina, aluminum fluoride, aluminum chloride, triphenyl aluminum; titan compounds, such as titanium tetra chloride; antimony compounds, such as antimony trichloride, antimony pentachloride, and dichlorotriphenyl antimony; uranium compounds, such as uranyl nitrate; cadmium compounds, such as cadmium nitride; cobalt compounds, such as cobalt chloride and cobalt bromide; thorium compounds, such as thorium nitride; mercury compounds, such as diphenyl mercury; nickel compounds, such as nickelocene; calcium compounds, such as calcium nitrate and calcium acetate; vanadium compounds, such as vanadium trichloride; copper compounds, such as copper chloride and copper iodide; manganese compounds, such as manganese chloride; zirconium compounds, such as zirconium chloride; arsenic compounds, such as triphenyl arsenic and arsenic trichloride; and boron compounds, such as boron trifluoride.

The polymerization catalyst (tertiary phosphine, tertiary amine, or Lewis acid) may be single or a mixture of two or more types. The preferable polymerization catalyst is a combination catalyst of tertiary phosphine and Lewis acid, or a combination catalyst of tertiary amine and Lewis acid. The combination catalyst of tri-n-butylphosphine and dibutyltin dichloride is particularly preferable.

Figure 2:
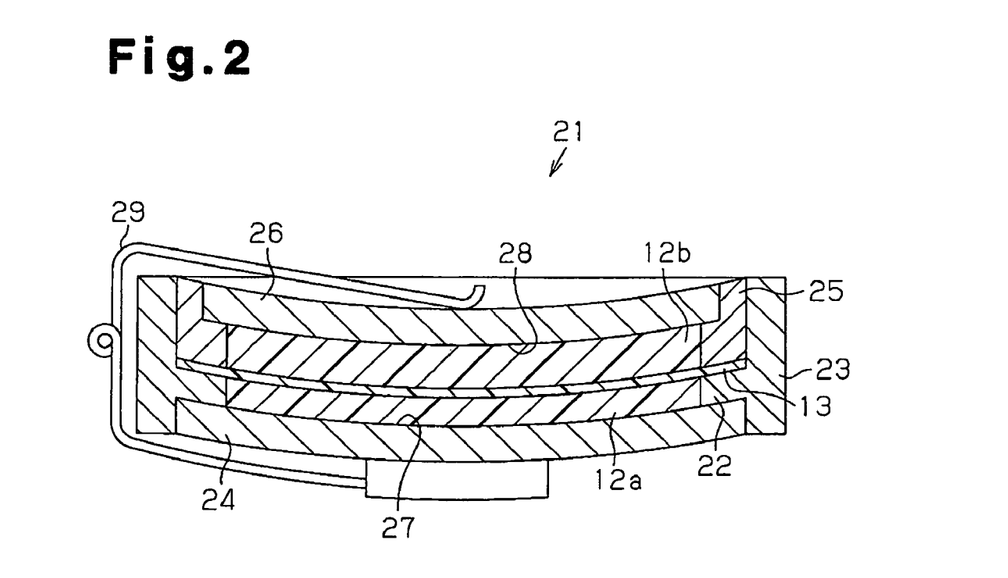
FIG. 2 is a cross-sectional view of a mold assembly for the polarizing plastic lens of FIG. 1.

The internal mold release agent prevents the lens layers 12a and 12b from adhering to the mold assembly 21 after the polarizing plastic lens 11 is molded and allows the polarizing plastic lens 11 to be easily removed from the mold assembly 21. Examples of said internal mold release agents include alkylester phosphate (Zelec UN made of DuPont), isopropyl acid phosphate, diisopropyl acid phosphate, butyl acid phosphate, dibutyl acid phosphate, octyl acid phosphate, dioctyl acid phosphate, isodecyl acid phosphate, diisodecyl acid phosphate, tridecy acid phosphate, and bis(tridecyl acid phosphate). The preferable internal mold release agent is Zelec UN. The preferable used amount of the internal mold release agent is between 1 to 5000 ppm.

The ultraviolet absorber provides the polarizing plastic lens 11 with the function to absorb the ultraviolet rays that affect the cornea or the lens of the eye. Examples of said ultraviolet absorber includes 2-(2-hydroxy-5-tert-butylphenyl)benzotriazole, 2-(3-tert-butyl-2-hydroxy-5-methyl phenyl)-5-chloro-2H-benzotriazole, 2-(2-hydroxy-5-tert-octyl phenyl)-2H-benzotriazole, 2-(3-tert-butyl-2-hydroxy-5-methyl phenyl)-5-chloro-2H-benzotriazole, 2-(2-hydroxy-5-methyl phenyl)-2H-benzotriazole, 2-(2-hydroxy-3,5-di-tert-butylphenyl)benzotriazole, 5-chloro-2-(3,5-di-tert-butyl-2-hydroxy phenyl)-2H-benzotriazole, 2-(3,5-di-tert-pentyl-2-hydroxy phenyl)-2H-benzotriazole, 2-(3,5-di-tert-butyl-2-hydroxy phenyl)-2H-benzotriazole, 2-(2H-benzotriazole-2-z,900 ))-4-methyl-(3,4,5,6-tetrahydrophthalimidyl methyl) phenol, and the like. 2-(2-hydroxy-5-methyl phenyl)-2H-benzotriazole, 2-(3-tert-butyl-2-hydroxy-5-methyl phenyl)-5-chloro-2H-benzotriazole, and 2-(2-hydroxy-5-tert-octyl phenyl)-2H-benzotriazole are preferable ultraviolet absorbers. The amount used of the ultraviolet absorber is preferably between 0.1 to 1.0% by mass, and more preferably between 0.3 and 0.8% by mass with respect to the total amount of the first compound and the second compound.

A manufacturing device (mold assembly 21) of the polarizing plastic lens 11 will now be described.

As shown in FIG. 2, the mold assembly 21 includes a gasket 23, a lower mold component 24, a fastening member 25, and an upper mold component 26. In one embodiment, the gasket 23 and the fastening member 25 are cylindrical. The gasket 23 has an inner circumference with an inwardly extending annular supporting protrusion 22. The lower mold component 24 is attached to the lower part of the gasket 23. The fastening member 25 has an inner surface with an annular engaging portion 25a that faces toward the annular supporting protrusion 22 when attached to the gasket 23. The upper mold component 26 is attached to the fastening member 25 and engages the engaging portion 25a. In one embodiment, the gasket 23 and the lower mold component 24 that are joined together function as a first mold component. The upper mold component 26 functions as the second mold component.

The lower mold component 24 and the upper mold component 26 are formed from glass materials. The inner surfaces of the lower mold component 24 and the upper mold component 26 are curved at a curvature corresponding to the curvature of the lens layers 12a and 12b. In the embodiment, the inner surfaces are curved surfaces gradually bulging downward. The lower and upper mold components 24 and 26 respectively close the lower opening and the upper opening of the gasket 23. The annular supporting protrusion 22 is slightly inclined downward. The engaging portion 25a of the fastening member 25 is slightly inclined downward. The annular supporting protrusion 22 and the engaging portion 25a sandwich the polarizing film 13. The distal surface of the annular supporting protrusion 22 and the inner surface of the lower mold component 24 define a first cavity 27. The distal surface of the engaging portion 25a and the inner surface of the upper mold component 26 define a second cavity 28.

A method for manufacturing the polarizing plastic lens 11 will now be described.

The lens formation composition is first deaerated under reduced pressure. A predetermined amount of deaerated lens formation composition is injected into the first cavity 27. This forms a first layer of the lens formation composition. The polarizing film 13, which has undergone a bending process in advance in accordance with the curvature of the lens layers 12a and 12b, is prepared. The polarizing film 13 is arranged on the first layer so that the peripheral edge of the polarizing film 13 is arranged on the annular supporting protrusion 22. The fastening member 25 is attached to the gasket 23, and the peripheral edge of the polarizing film 13 is fixed between the fastening member 25 and the gasket 23. A predetermined amount of the lens formation composition is then injected into the second cavity 28. This forms a second layer of the lens formation composition. The upper mold component 26 is attached to the fastening member 25. The two molds 24 and 26 are fastened with a clip 29.

The mold assembly 21 is gradually heated to about 140° C. The lens formation compositions of the first layer and the second layer are then polymerized and cured. Thereafter, the clip 29 is removed and the two mold components 24 and 26, the fastening member 25 and the gasket 23 are disassembled so that the polarizing plastic lens 11 can be taken out from the mold assembly 21. Since the lens formation composition contains the internal mold release agent, the molds 24 and 26, the fastening member 25 and the gasket 26 are easily disassembled, and the polarizing plastic lens 11 is easily removed from the mold assembly 21.

The first embodiment has the advantages described below.

The lens layers 12a and 12b are integrally formed with the polarizing film 13 by polymerizing the polymerization raw material composition in a state in which the polymerization raw material composition contacts the polarizing film 13. Chemical bond (urethane bond or thiourethane bond) is formed between the first functional group (isocyanate functional group or isothiocyanate functional group) contained in the resin constituting the lens layers 12a and 12b and hydroxyl group contained in the resin constituting the polarizing film 13. That is, the lens layers 12a and 12b and the polarizing film 13 are directly chemically bonded. The adhesive force between the lens layers 12a and 12b and the polarizing film 13 is high, and the adhesive force does not lower when environmental changes occur. This effectively prevents the polarizing film 13 from being separated from the lens layers 12a and 12b even if the lens layers 12a and 12b and the polarizing film 13 have different coefficients of thermal expansion.

In the method for manufacturing the polarizing plastic lens 11, the lens layers 12a and 12b are integrally molded on both surfaces of the polarizing film 13. Thus, an adhesive for adhering the lens layers 12a and 12b and the polarizing film 13 is unnecessary, and the polarizing plastic lens 11 can be easily manufactured. In addition, since the lens layers 12a and 12b are molded with the polarizing film 13 fixed by the fastening member 25, wrinkles or distortions due not form in the polarizing film 13, and the polarizing plastic lens 11 effectively exhibits the desired function.

When m-xylylendiisocyanate containing two isocyanate functional groups in one molecule is selected as one main component of the polymerization raw material composition for the lens layers 12a and 12b, isocyanate functional group of the m-xylylendiisocyanate easily reacts with hydroxyl group contained in the resin constituting the polarizing film 13, and thus urethane bond is likely to be formed between the two groups, and high cross-linking density is obtained. The adhesiveness between the lens layers 12a and 12b and the polarizing film 13 is thus enhanced.

When the multi-functional mercapto compound is selected as one main component of the polymerization raw material composition for the lens layers 12a and 12b, the refractive index of the lens layers 12a and 12b is enhanced by a plurality of sulfur atoms contained in the lens layers 12a and 12b, and thus the lens layers 12a and 12b may be thinned. Therefore, a thin polarizing plastic lens 11 is obtained.

The composition ratio of the first compound and the second compound is adjusted so that the equivalence ratio of the functional group expressed by [(—NCO)+]—NCS)]/[(—OH)+(—SH)] is 0.5 to 1.5. In parallel with the polymerizing and curing reaction of the polymerization raw material composition, the chemical bond (urethane bond or thiourethane bond) is reliably formed between the lens layers 12a and 12b and the resin forming the polarizing film 13. This effectively prevents the polarizing film 13 from being separated from the lens layers 12a and 12b.

A second embodiment differs from the first embodiment in the method for manufacturing the polarizing plastic lens 11 and the mold assembly. Such difference will now be described.

The method for manufacturing the polarizing plastic lens 11 in the second embodiment includes a first step of molding an intermediate molded product in which the lens layer is stacked on a first main surface of the polarizing film 13, and a second step of molding a polarizing plastic optical element by stacking the lens layer on a second main surface of the polarizing film 13 of the intermediate molded product.

Figure 5A:
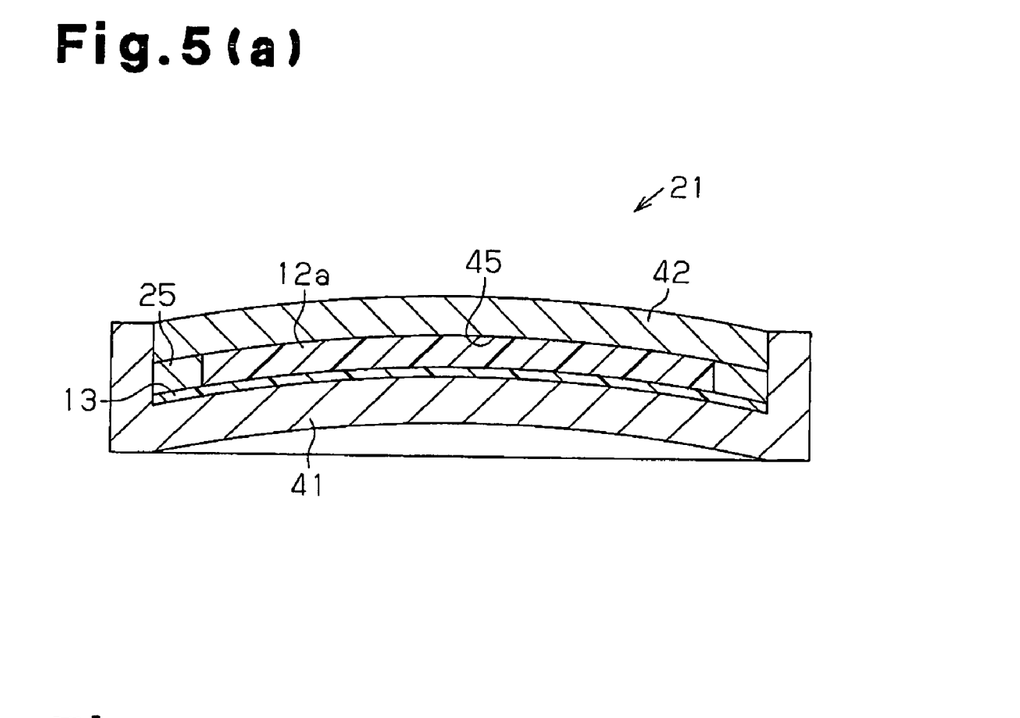
FIGS. 5(a) and (b) are cross-sectional views of a mold assembly for a polarizing plastic lens according to a second embodiment.

The mold assembly 21 will now be described. As shown in FIG. 5(a), the mold assembly 21 used in the first step of integrating the polarizing film 13 and the lens layer 12a and molding the intermediate molded product includes a lower mold component 41 (first mold component), an upper mold component 42 (second mold component) that closes the opening of the lower mold component 41, and the fastening member 25 arranged on the bottom surface of the lower mold component 41 for sandwiching the polarizing film 13 in cooperation with the inner bottom surface of the lower mold component 41. In one embodiment, the lower mold component 41 is cylindrical and has a closed bottom, the upper mold component 42 has the shape of a circular disc, and the fastening member 25 is annular. The bottom of the lower mold component 41 and the upper mold component 42 have curved surfaces that gradually bulge upward. The fastening member 25 is shaped in correspondence with the bottom surface and side surface of the lower mold component 41 and is inclined upward toward the inner side of the mold assembly 21. The lower mold component 41 and the upper side mold component 42 function as the mold components in the first step.

Figure 5B:
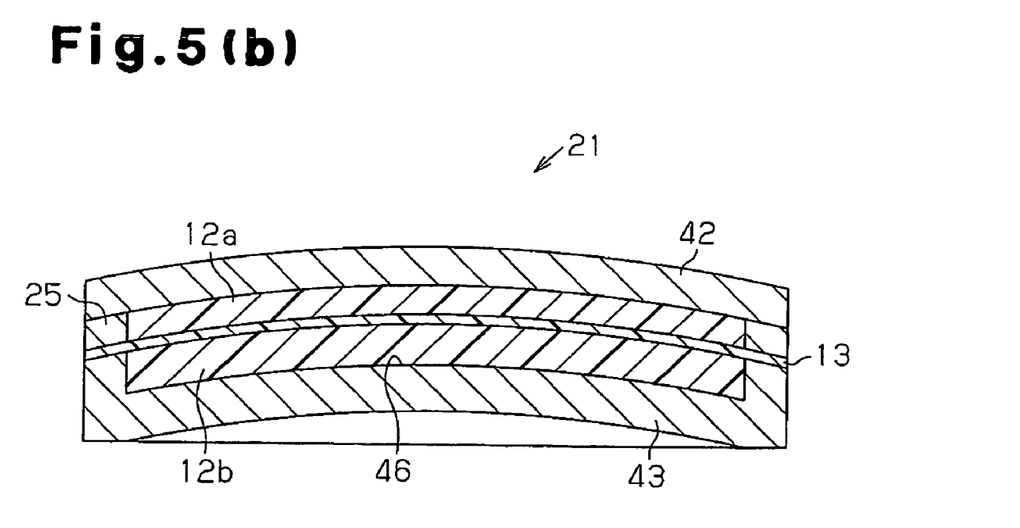

As shown in FIG. 5(b), the mold assembly 21 used in the second step of integrating the lens layer 12b to the polarizing film 13 of the intermediate molded product includes a lower mold component 43 (third mold component). The lower mold component 43 is shaped similar to the lower mold component 41 but is smaller than the lower mold component 41 in terms of radial dimension. The upper mold component 42 and the lower mold component 43 function as mold components in the second step.

The method for manufacturing the polarizing plastic lens 11 will now be described. As shown in FIG. 5(a), the polarizing film 13 is first arranged on the inner bottom surface of the lower mold component 41. The polarizing film 13 is fixed to the lower mold component 41 by pressing the peripheral edge of the polarizing film 13 with the fastening member 25. The upper mold component 42 is fitted to the lower mold component 41 to close the opening of the lower mold component 41. A first cavity 45 is defined between the polarizing film 13 and the upper mold component 42 when mold clamping is performed. The lens formation composition is injected into the first cavity 45 and then polymerized and cured. This obtains the intermediate molded product.

Then, as shown in FIG. 5(b), only the lower mold component 41 is released. The intermediate molded product together with the upper mold component 42 and the fastening member 25 is mounted on the lower mold component 43 so that the edge of the lower mold component 43 supports the lower surface of the polarizing film 13. This defines a second cavity 46 between the lower mold component 43 and the polarizing film 13. The lens formation composition is injected into the second cavity 46 with the lower mold component 43 and the upper mold component 42 in the mold clamped state, and then polymerized and cured. The polarizing plastic lens 11 is manufactured by releasing the molds 42 and 43 and the fastening member 25.

In the method for manufacturing the polarizing plastic lens 11 of the second embodiment, the entire polarizing film 13 is not immersed in the lens raw material since the polarizing film 13 made of polyvinyl alcohol resin is sequentially immersed in the lens formation composition one surface at a time. This prevents the polarizing film 13 from softening and loosing flatness.

A method for manufacturing the polarizing plastic lens 11 of a third embodiment will now be described. In the third embodiment, the lens formation composition is polymerized and cured according to the method of the first embodiment or the second embodiment to manufacture a molded product having the same shape as the polarizing plastic lens 11. The molded product is then annealed to manufacture the polarizing plastic lens 11.

The temperature of annealing is in a range between the glass transition temperature (Tg) of the molded product and a temperature 20° C. higher than the glass transition temperature (Tg+20° C.). If the temperature of annealing is lower than the glass transition temperature, the residual stress of the molded product is not sufficiently removed, and the strength of the polarizing plastic lens may be insufficient. If the temperature of annealing is higher than the above range, suppression of distortion caused by polymerization (polymerization distortion) or deformation of the lens layers 12a and 12b may be insufficient. The polarizing plastic lens 11 subjected to annealing in the above temperature range has suitable strength. Further, polymerization distortion and deformation of the lens layers 12a and 12b are suppressed.

Each embodiment may be modified as below.

(1) The polarizing plastic lens 11 of the first embodiment may be manufactured with the manufacturing method described below. The polarizing film 13 is fixed in the gasket 23. The mold components 24 and 26 are attached to the gasket 23, and two cavities partitioned by the polarizing film 13 are defined by the inner surface of the lower mold component 24 and the inner surface of the upper mold component 26. The lens formation composition is injected into the two cavities, and the lens formation composition is polymerized and cured.

Figure 3:
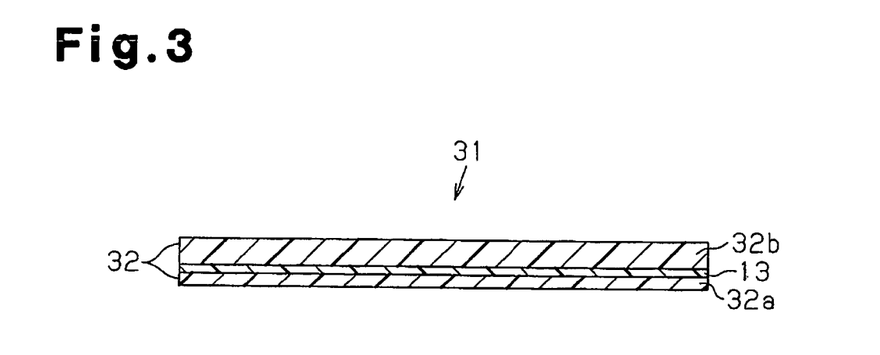
FIG. 3 is a cross-sectional view of a polarizing plastic lens.

(2) The polarizing plastic film 31 shown in FIG. 3 may be manufactured using a manufacturing method similar to the first embodiment. A polarizing plastic film 31 includes the polarizing film 13 and two transparent layers (optical resin layers) 32a and 32b arranged on the two main surfaces of the polarizing film 13. Two transparent layers 32a and 32b have different thicknesses. The formation composition of the transparent layers 32a and 32b is similar to the formation composition of the lens layers 12a and 12b. That is, the first functional group (isocyanate functional group or isothiocyanate functional group) contained in the formation composition form a chemical bond (urethane bond or thiourethane bond) with hydroxyl group of resin constituting the polarizing film 13. The transparent layers 32a and 32b are thus integrated with the polarizing film 13. The thickness of the polarizing plastic film 31 is adjusted to about 300 μm. The polarizing plastic film 31 is suitable for use in display devices such as liquid crystal display (LCD) and plasma display (PDP). For example, the polarizing plastic film 31 may be attached or adhered to the display surface of a display device.

Figure 4:
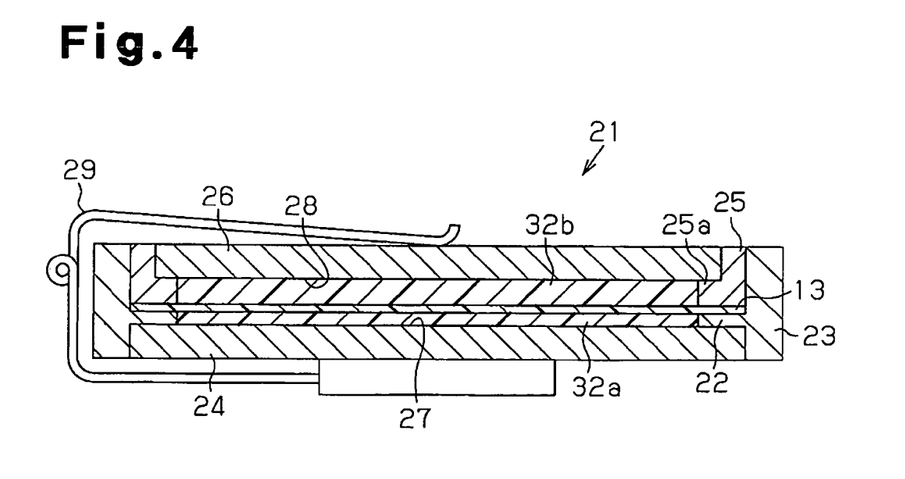
FIG. 4 is a cross-sectional view of a mold assembly for the polarizing plastic lens of FIG. 3.

As shown in FIG. 4, the mold assembly 21 for the polarizing plastic film 31 includes mold components 24 and 26, the gasket 23, and the fastening member 25. The annular supporting protrusion 22 of the gasket 23 and the engaging portion 25a of the fastening member 25 are planar.

Since the transparent layers 32a and 32b and the polarizing film 13 are integrated with high adhering force, the polarizing film 13 is prevented from being separated from the transparent layers 32a and 32b. The manufacturing of the polarizing plastic film 31 is easy since the transparent layers 32a and 32b are integrally molded to the two main surfaces of the polarizing film 13. The polarizing plastic film 31 may be manufactured according to the method of (1).

(3) The polarizing plastic film 31 may be manufactured according to a manufacturing method similar to the second embodiment. In the mold assembly for the polarizing plastic film 31, the inner bottom surfaces of the lower mold components 41 and 43, the fastening member 25, and the upper mold component 42 are planar. In such a manufacturing method, the two main surfaces of the polarizing film 13 made of polyvinyl alcohol resin are sequentially immersed in the lens formation composition one surface at a time, and thus the entire polarizing film 13 is not immersed in the lens formation composition at once. Thus, the polarizing film 13 does not soften and the planarity is not lost. Therefore, a polarizing plastic film 31 having a desired optical property (polarizing property) is manufactured.

(4) In the manufacturing methods described in (2) and (3), annealing similar to the third embodiment may be performed. In this case, separation of the polarizing film 13 from the transparent layers 32a and 32b, as well as polymerization distortion and deformation of the transparent layers 32a and 32b are optimally suppressed.

(5) The manufacturing method of the second embodiment may be modified as below. First, the intermediate molded product is molded. Then, the lower mold component 41, the fastening member 25, and the upper mold component 42 are released. Next, the intermediate molded product is arranged in a lower mold component, fastening member, and upper mold component, which are shaped differently from the components 41, 25, and 42. The polarizing plastic lens 11 is then manufactured in a manner similar to the second embodiment. The polarizing plastic film 31 may be manufactured according to this method.

(6) The manufacturing method of the second embodiment may be modified as below. First, the intermediate molded product is molded. The lower mold component 41 is then removed, and the lens formation composition is applied or sprayed to the second main surface of the polarizing film 13. Similar to the second embodiment, the lower mold component 43 is arranged at a predetermined position. The lens formation composition is then polymerized and cured. The polarizing plastic film 31 may be manufactured according to this method.

(7) The inner bottom surface of the lower mold component 24 and the inner surface of the upper mold component 26 configuring the mold assembly 21 of the first embodiment may be a curved surface gradually bulging upward. In this case, the annular supporting protrusion 22 and the engaging portion 25a of the fastening member 25 are formed so as to slightly incline upward.

(8) The inner bottom surface of the lower mold component 41 and the lower mold component 43 and the inner surface of the upper mold component 42 forming the mold assembly 21 of the second embodiment may be a curved surface gradually bulging downward. In this case, the fastening member 25 may be formed so as to incline downward towards the inner side.

(9) The lower mold component 43 of the second embodiment may be obtained by polymerizing and curing the lens formation composition. In this case, the lens formation composition used in the manufacturing process of the polarizing plastic lens 11 may be used. This reduces the manufacturing cost.

(10) The fastening member in each embodiment may be, for example, an adhesive tape.

(11) Processes for enhancing wear resistance, defogging, strength, and chemical proof properties and for improving anti-reflection and fashionability to the polarizing plastic optical element may be performed. For example, a surface polishing process, an antistatic process, a hard coating process, a non-reflection coating process, a dyeing process, and a light modulating process may be performed on the lens layers 12a and 12b. The polarizing plastic optical element processed in this manner is optimal for use in sports goggles, protection eyeglasses for welding, organic solvent handling work, or the like, and fashion eyeglasses.

(12) The polarizing film 13 may be a film prepared by immersing dichroic dye. This type of dichroic dye includes direct black 17, 19, 154; direct brown 44, 106, 195, 210, 223; direct red 2, 23, 28, 31, 37, 39, 79, 81, 240, 242, 247; direct blue 1, 15, 22, 78, 90, 98, 151, 168, 202, 236, 249, 270; direct violet 9, 12, 51, 98; direct green 1, 85; direct yellow 8, 12, 44, 86, 87; direct orange 26, 39, 106, 107 etc.

The present invention will now be more specifically described with examples and comparative examples.

EXAMPLES 1 TO 6, COMPARATIVE EXAMPLE 1

The polarizing plastic lenses of examples 1 to 6 and comparative example 1 were manufactured and the properties thereof were evaluated. The property evaluation (3) was not performed for example 1 and example 2. "Part" in each examples 1 to 5 and comparative example 1 refers to "mass part". In examples 1 to 6 and comparative example 1, the lens layer 12a was formed on the first main surface of the polarizing film 12 and the lens layer 12b was not formed on the second main surface to easily check the adhesiveness between the lens layer and the polarizing film 13. The measurement result of each property evaluation is shown in table 1 along with the refractive index, Abbe number, specific gravity, and glass transition temperature of the lens layer 12a of the polarizing plastic lens obtained in each example.

Example 1

43.5 parts (0.23 mol, equivalent weight of 0.46 of isocyanate functional group) of m-xylylendiisocyanate and 56.5 part (0.115 mol, equivalent weight of 0.46 of mercapto group) of pentaerythritol tetrakis(3-mercaptopropionate) serving as the polymerization raw material composition, 0.01% by mass of dibutyltin dichloride serving as the polymerization catalyst, 0.1% by mass of Zelec UN serving as the internal mold release agent, and 0.02% by mass of 2-(2-hydroxy-5-methylphenyl)-2H-benzatriazole serving as the ultraviolet absorber were mixed to prepare the lens formation composition. The polarizing plastic lens of example 1 was manufactured through the manufacturing method of the first embodiment. The equivalence ratio of the functional group of m-xylylendiisocyanate with respect to the functional group of pentaerythritol tetrakis(3-mercaptopropionate) is 1.0.

Example 2

52 part (0.276 mol, equivalent weight of 0.552 of isocyanate functional group) of m-xylylendiisocyanate and 48 part (0.184 mol, equivalent weight of 0.92 of mercapto group) of 1,2-bis(2-mercaptoethylthio)-3-mercaptopropane serving as the polymerization raw material composition, 0.015% by mass of dibutyltin dichloride serving as the polymerization catalyst, 0.1% by mass of Zelec UN serving as the internal mold release agent, and 0.024% by mass of 2-(2-hydroxy-5-methylphenyl)-2H-benzatriazole serving as the ultraviolet absorber were mixed to prepare the lens formation composition. The polarizing plastic lens of example 2 was manufactured through the above manufacturing method using the mold assembly 21 shown in FIG. 2. Similar to example 1, the performance evaluation was carried out according to the evaluation criteria of (evaluation 1) and (evaluation 2). The equivalence ratio of the functional group of m-xylylendiisocyanate with respect to the functional group of 1,2-bis(2-mercaptoethylthio)-3-mercaptopropane was 1.0.

Example 3

The lens formation composition prepared in example 1 was sufficiently deaerated, and injected into the mold assembly 21. The polarizing film 13 was arranged at a predetermined position. Next, the mold assembly 21 was gradually heated from 30° C. to 120° C. and the lens formation composition was polymerized and cured for 24 hours. The mold assembly 21 was gradually cooled to obtain the molded product. The molded product underwent annealing for an hour at 100° C. to manufacture the polarizing plastic lens of example 3.

The glass transition temperature of the lens layer 12a in example 3 is 85° C. (see table 1). That is, in example 3, the lens layer 12a underwent annealing at a temperature within a predetermined range of the glass transition temperature of the lens layer 12a and a temperature 20° C. higher than the glass transition temperature.

Example 4

With respect to example 2, the ultraviolet absorber was changed to 0.05% by mass of 2-(3-tert-butyl-2-hydroxy-5-methylphenyl)-5-chloro-2H-benzotriazole to prepare the lens formation composition. This lens formation composition was sufficiently deaerated and injected into the mold assembly 21. Thereafter, the polarizing film 13 was arranged at a predetermined position. Next, the mold assembly was gradually heated from 30° C. to 120° C., and the lens formation composition was polymerized and cured for 24 hours. Then, the mold assembly 21 was gradually cooled to obtain the molded product. The molded product underwent annealing for one hour at 100° C. to manufacture the polarizing plastic lens. Since the glass transition temperature of the lens layers 12a of example 4 is 90° C., annealing was performed at a temperature also within the above predetermined range.

Example 5

96.1 part (0.5 mol, equivalent weight of 1.0 of isocyanate functional group) of 1,4-bis(isocyanatemethyl) cyclohexane and 87 part (0.33 mol, equivalent weight of 1.0 of mercapto group) of 1,2-bis(2-mercaptoethylthio)-3-mercaptopropane serving as the polymerization raw material composition, 0.01% by mass of dibutyltin dichloride serving as the polymerization catalyst, 0.1% by mass of Zelec UN serving as the internal mold release agent, and 0.05% by mass of 2-(2-hydroxy-5-tert-octylphenyl)-2H-benzatriazole serving as the ultraviolet absorber were mixed to prepare the lens formation composition. The lens formation composition was sufficiently deaerated and injected into the mold assembly 21. Thereafter, the polarizing film 13 was arranged at a predetermined position. Next, the mold assembly 21 was gradually heated from 30° C. to 100° C., and the lens formation composition was polymerized and cured for 24 hours. Subsequently, the mold assembly 21 was gradually cooled to obtain the molded product. The molded product underwent annealing for one hour at 100° C. to manufacture the polarizing plastic lens. The equivalence ratio of the functional group of 1,4-bis(isocyanatemethyl)cyclohexane with respect to the functional group of 1,2-bis(2-mercaptoethylthio)-3-mercaptopropane was 1.0. Since the glass transition temperature of the lens layer 12a of example 5 was 95° C., annealing was performed at a temperature also within the above predetermined range.

Example 6

96.1 part (0.5 mol, equivalent weight of 1.0 of isocyanate functional group) of 1,4-bis(isocyanatemethyl) cyclohexane and 87 part (0.33 mol, equivalent weight of 1.0 of mercapto group) of 1,2-bis(2-mercaptoethylthio)-3-mercaptopropane serving as the polymerization raw material composition, 0.02% by mass of dibutyltin dichloride serving as the polymerization catalyst, 0.1% by mass of Zelec UN serving as the internal mold release agent, and 0.05% by mass of 2-(2-hydroxy-5-tert-octylphenyl)-2H-benzatriazole serving as the ultraviolet absorber were mixed to prepare the lens formation composition. The lens formation composition was sufficiently deaerated and injected into the mold assembly 21. Thereafter, the polarizing film 13 was arranged at a predetermined position. Next, the mold assembly 21 was gradually heated from 30° C. to 130° C., and the lens formation composition was polymerized and cured for 24 hours. Subsequently, the mold assembly 21 was gradually cooled to obtain the molded product. The molded product underwent annealing for one hour at 120° C. to manufacture the polarizing plastic lens. The equivalence ratio of the functional group of 1,4-bis(isocyanatemethyl)cyclohexane with respect to the functional group of 1,2-bis(2-mercaptoethylthio)-3-mercaptopropane was 1.0. Since the glass transition temperature of the lens layer 12a of example 6 was 110° C., annealing was performed at a temperature also within the above predetermined range.

Comparative Example 1

100 part (0.365 mol) of diethylene glycol bis(allyl carbonate) serving as the polymerization raw material composition, 3.0% by mass of diisopropylperoxydicarbonate serving as the radical polymerization initiator, and 0.05% by mass of 2-hydroxy-4-metoxybenzophenone serving as the ultraviolet absorber were mixed to prepare the lens formation composition. The polarizing plastic lens was manufactured through the manufacturing method of the first embodiment using the mold assembly 21.

Impact Resistance Evaluation (Evaluation 1)

The polarizing plastic lens obtained in each example was held in a hand, and the polarizing plastic lens was hit against a table a plurality of times to check the adhering state of the polarizing film 13 with respect to the lens layer 12a. Two evaluation were made, one being the polarizing film 13 did not separate from and remained adhered to the lens layer 12a (○) and the other being the polarizing film 13 separated from the lens layer 12a (x).

Water Resistance Evaluation (Evaluation 2)

The adhering state of the polarizing film 13 with respect to the lens layer 12a was checked by immersing the polarizing plastic lens obtained in each example in warm water of 50° C. for 15 hours and then rubbing the surface of the polarizing film 13 with a fingertip with the surface of the polarizing plastic lens remained immersed in warm water. Three evaluations were made, no color fading and no separation (◎), partial color fading confirmed but no separation (○), and partial color fading and separation confirmed (x).

Polymerization Distortion and Deformation (Evaluation 3)

The presence of polymerization distortion of the polarizing plastic lens obtained in each example was observed using a distortion measurement instrument. The polarizing plastic lens was arranged on a table so that the curved surface bulged upwards, and external force was applied to the surroundings of the polarizing plastic lens. In this state, swinging of the polarizing plastic lens was visually evaluated, and the presence of deformation of the polarizing plastic lens was checked. Three evaluations were made, no polarization distortion or deformation (○), slight polymerization distortion or deformation confirmed (Δ), and significant polymerization distortion or deformation confirmed (x).

TABLE 1

|  | Refractive Index | Abbe Number | Specific Gravity (g/m2) | Tg (° C.) | Impact Resistance | Water Resistance | Distortion/ Deformation |
|---|---|---|---|---|---|---|---|
| Example 1 | 1.6 | 36 | 1.34 | — | ○ | ○ | — |
| Example 2 | 1.67 | 32 | 1.34 | — | ○ | ○ | — |
| Example 3 | 1.6 | 36 | 1.34 | 85 | ○ | ○ | ○ |
| Example 4 | 1.67 | 32 | 1.34 | 90 | ○ | ○ | ○ |

TABLE 1-continued

|  | Refractive Index | Abbe Number | Specific Gravity (g/m2) | Tg (° C.) | Impact Resistance | Water Resistance | Distortion/ Deformation |
|---|---|---|---|---|---|---|---|
| Example 5 | 1.62 | 39 | 1.29 | 95 | ○ | ○ | ○ |
| Example 6 | 1.62 | 39 | 1.29 | 110 | ○ | ○ | Δ |
| Comp. Example 1 | 1.5 | 58 | 1.32 | 75 | X | X | X |

As shown in table 1, since the polarizing film 13 and the lens layer 12 were strongly adhered through urethane bonding between isocyanate functional group and hydroxyl group in examples 1 to 6, satisfactory results were obtained for impact resistance and water resistance. That is, separation of the polarizing film 13 from the lens layer 12a was prevented. The polymerization distortion and deformation of the lens layer 12a were sufficiently suppressed due to annealing in examples 3 to 5. However, since the temperature of annealing was high in example 6 compared to the other examples, polymerization distortion and deformation of the lens layer 12a were not sufficiently suppressed. Therefore, the temperature of annealing in the present invention is preferably higher than the glass transition temperature and lower than or equal to 110° C., taking into account the glass transition temperature of each example.

Since the chemical bond is not particularly formed between diethylene glycol bis(allyl carbonate) constituting the lens layer 12a and polyvinyl alcohol resin constituting the polarizing film 13 in comparative example 1, the adhesiveness between the polarizing film 13 and the lens layer 12a decreases. Thus, the polarizing film 13 is easily separated. The impact resistance and water resistance of the polarizing plastic lens were thus insufficient in comparative example 1.

The invention claimed is:

1. A method for manufacturing a polarizing plastic optical element including a polarizing film, which contains a hydroxyl group-containing resin, and optical resin layers, the method comprising the steps of:

preparing a polymerization raw material composition for forming the optical resin layers and containing a first compound containing a first functional group, a second compound containing a second functional group, and a polymerization catalyst, the first and second compounds being main components of the polymerization raw material composition, the first functional group being at least one selected from isocyanate functional group and isothiocyanate functional group, the second functional group being at least one selected from hydroxyl group and mercapto group;

preparing a mold assembly including a first mold component having an inner bottom surface, a fastening member attached to the first mold component, and a second mold component attached to the first mold component;

arranging the polarizing film on the inner bottom surface of the first mold component;

attaching the fastening member to the first mold component and holding a peripheral portion of the polarizing film between the fastening member and the first mold component;

attaching the second mold component to the first mold component and defining a first cavity between the second mold component and a first main surface of the polarizing film;

injecting the polymerization raw material composition into the first cavity;

polymerizing and curing the polymerization raw material composition to form one of an urethane bond and a thiourethane bond between the hydroxyl group included in the polarizing film and the first functional group included in the optical resin layer in the first cavity to mold an intermediate molded product including an optical resin layer integrated with the first main surface of the polarizing film;

removing the intermediate molded product together with the second mold component and the fastening member from the first mold component;

attaching the intermediate molded product together with the second mold component and the fastening member to a third mold component that is smaller than the first mold component to support the peripheral portion of the polarizing film included in the intermediate molded product by the third mold component and defining a second cavity between a second main surface of the polarizing film and an inner surface of the third mold component;

injecting the polymerization raw material composition into the second cavity; and polymerizing and curing the polymerization raw material composition in the second cavity to form one of an urethane bond and a thiourethane bond between the hydroxyl group included in the polarizing film and the first functional group included in the optical resin layer in the second cavity.

2. The method for manufacturing the polarizing plastic optical element according to claim 1, further comprising the step of annealing a molded product, which is obtained after curing the polymerization raw material composition, in a range between a glass transition temperature of the molded product and a temperature 20° C. higher than the glass transition temperature.

3. The method for manufacturing the polarizing plastic optical element according to claim 1, wherein polymerization reaction of the polymerization raw material composition occurs in a state contacting the polarizing film.

4. The method for manufacturing the polarizing plastic optical element according to claim 1, wherein the first mold component includes a curved inner bottom surface, the second mold component includes a curved inner surface, the optical resin layers are lens layers having curved surfaces, and the polarizing plastic optical element is a polarizing plastic lens.

5. The method for manufacturing the polarizing plastic optical element according to claim 1, wherein the first mold component has a flat inner bottom surface, the second mold component has a flat inner surface, the optical resin layers are transparent layers having flat surfaces, and the polarizing plastic optical element is a polarizing plastic lens.

* * * * *